United States Patent
Lofter et al.

(10) Patent No.: US 11,341,844 B2
(45) Date of Patent: May 24, 2022

(54) METHOD AND SYSTEM FOR DETERMINING DRIVING ASSISTING DATA

(71) Applicant: Zenuity AB, Gothenburg (SE)

(72) Inventors: Per Lofter, Stora Höga (SE); Mats Kvarnström, Billdal (SE)

(73) Assignee: ZENUITY AB, Gothenburg (SE)

( * ) Notice: Subject to any disclaimer, the term of this patent is extended or adjusted under 35 U.S.C. 154(b) by 57 days.

(21) Appl. No.: 16/885,613

(22) Filed: May 28, 2020

(65) Prior Publication Data

US 2020/0380859 A1  Dec. 3, 2020

(30) Foreign Application Priority Data

May 29, 2019 (EP) .................................. 19177408

(51) Int. Cl.

| | |
|---|---|
| *G08G 1/01* | (2006.01) |
| *B60W 50/00* | (2006.01) |
| *G05D 1/02* | (2020.01) |
| *G08G 1/00* | (2006.01) |

(52) U.S. Cl.
CPC ....... *G08G 1/0108* (2013.01); *B60W 50/0098* (2013.01); *G05D 1/0214* (2013.01); *G08G 1/20* (2013.01); *B60W 2552/00* (2020.02); *B60W 2554/406* (2020.02); *G05D 2201/0213* (2013.01)

(58) Field of Classification Search
CPC ... G08G 1/0108; G08G 1/20; B60W 50/0098; B60W 2552/00; B60W 2554/406; G05D 1/0214; G05D 2201/0213
See application file for complete search history.

(56) References Cited

U.S. PATENT DOCUMENTS

| | | | |
|---|---|---|---|
| 8,520,695 B1* | 8/2013 | Rubin | G08G 1/096791 |
| | | | 370/445 |
| 9,310,804 B1* | 4/2016 | Ferguson | G05D 1/0212 |
| 9,953,535 B1* | 4/2018 | Canavor | H04W 4/70 |
| 10,926,777 B2* | 2/2021 | McGill | B60W 50/0097 |
| 2015/0198692 A1* | 7/2015 | Goto | G08G 1/163 |
| | | | 342/385 |

(Continued)

FOREIGN PATENT DOCUMENTS

| | | |
|---|---|---|
| EP | 2958783 A1 | 12/2015 |
| EP | 3291197 A1 | 3/2018 |

OTHER PUBLICATIONS

Extended European Search Report dated Nov. 22, 2019 for European Patent Application No. 19177408.2, 10 pages.

*Primary Examiner* — Hussein Elchanti
(74) *Attorney, Agent, or Firm* — Sage Patent Group

(57) ABSTRACT

A method, a central control system and a non-transitory computer-readable storage medium are provided for determining driving assisting data in relation to a vehicle based on sensor data and map data in relation to other vehicles. Sensor data are obtained from a sensor system of a first vehicle, the sensor data comprising a pose and a velocity of a second vehicle located in a surrounding environment of the first vehicle. Furthermore, map data are obtained comprising a road geometry of the surrounding environment of the first vehicle. The pose and the velocity of the second vehicle are compared with the map data, and driving assisting data in relation to a third vehicle are determined based on the comparison.

16 Claims, 4 Drawing Sheets

(56) References Cited

U.S. PATENT DOCUMENTS

| | | |
|---|---|---|
| 2016/0318511 A1 | 11/2016 | Rangwala |
| 2017/0154525 A1* | 6/2017 | Zou .................... G08G 1/0145 |
| 2017/0154531 A1* | 6/2017 | Funabashi .......... G08G 1/09626 |
| 2018/0208195 A1 | 7/2018 | Hutcheson et al. |
| 2018/0253968 A1* | 9/2018 | Yalla ...................... G08G 1/097 |
| 2018/0253975 A1* | 9/2018 | Mizutani ................ G08G 1/167 |
| 2018/0336785 A1 | 11/2018 | Ghannam et al. |
| 2019/0049992 A1 | 2/2019 | Riess et al. |
| 2019/0082377 A1* | 3/2019 | Silver ............... G08G 1/096741 |
| 2019/0180617 A1* | 6/2019 | Hori ................. B60W 50/0097 |
| 2019/0213882 A1* | 7/2019 | Sachs ..................... G08G 1/162 |
| 2019/0272747 A1* | 9/2019 | Raamot ................... G08G 1/08 |
| 2019/0378414 A1* | 12/2019 | Pari ....................... G08G 1/005 |
| 2019/0392715 A1* | 12/2019 | Strauß ................. G05D 1/0246 |
| 2020/0055515 A1* | 2/2020 | Herman ................ G06V 10/82 |
| 2020/0086789 A1* | 3/2020 | Nowakowski ............ B60R 1/00 |
| 2020/0152058 A1* | 5/2020 | Edwards ............... G08G 1/093 |
| 2020/0272159 A1* | 8/2020 | Zhang ................. G05D 1/0221 |
| 2020/0380859 A1* | 12/2020 | Lofter .................... G06V 20/58 |
| 2021/0003419 A1* | 1/2021 | Hamer .................. G01C 21/32 |
| 2021/0009154 A1* | 1/2021 | Wray .................... G08G 1/163 |

* cited by examiner

METHOD AND SYSTEM FOR DETERMINING DRIVING ASSISTING DATA

CROSS-REFERENCE TO RELATED APPLICATIONS

The present application for patent claims priority to European Patent Office Application Ser. No. 19177408.2, entitled "METHOD AND SYSTEM FOR DETERMINING DRIVING ASSISTING DATA" filed on May 29, 2019, assigned to the assignee hereof, and expressly incorporated herein by reference.

TECHNICAL FIELD OF THE INVENTION

The present invention relates to a method and a vehicle control system for determining driving assisting data in relation to a vehicle based on sensor data and map data in relation to other vehicles.

BACKGROUND

Today, many vehicles have a variety of driver support functions in the form of advanced driver assistance systems (ADAS) features. Also, many of these features form a basis for current and future autonomous drive (AD) features. Examples of ADAS features include lane departure warning systems, lane centering, lane keeping aid, pilot assist, lane change assistance, parking sensors, pedestrian protection systems, blind spot monitors, adaptive cruise control (ACC), anti-lock braking systems, and so forth. These features supplement the traditional driver control of the vehicle with one or more warnings or automated actions in response to certain scenarios.

An important requirement on vehicles with ADAS or AD systems or features is that they can reliably identify a road geometry and/or a traffic condition ahead. In an effort to achieve this, presently known methods and systems including forward-looking sensors that directly perceive the road geometry, and a map that contains a road geometry (often referred to as an HD-map) together with a module that estimates the vehicle's position in the map. However, problems remain with the presently known methods and systems. For example, existing methods and systems lack the accuracy to reliably identification of a road geometry and/or a traffic condition.

There is therefore a need for a method and system that enable more reliable identification of a road geometry and/or a traffic condition ahead than presently known systems and methods.

SUMMARY OF THE INVENTION

An object of the present disclosure is to provide a method, vehicle control system and a non-transitory computer-readable storage medium, which seek to mitigate, alleviate, or eliminate one or more of the above-identified deficiencies in the art and drawbacks of presently known systems and methods.

This object is achieved by a method, vehicle control system and a non-transitory computer-readable storage medium as defined in the appended claims. The term exemplary is in the present context to be understood as serving as an instance, example or illustration.

According to a first aspect of the present disclosure, there is provided a method for determining driving assisting data in relation to a vehicle based on sensor data and map data in relation to other vehicles. The method comprises obtaining sensor data from a sensor system of a first vehicle, the sensor data comprising a pose and a velocity of a second vehicle located in a surrounding environment of the first vehicle, and obtaining map data comprising a road geometry of the surrounding environment of the first vehicle. The method further comprises comparing the pose and the velocity of the second vehicle with the map data, and determining driving assisting data in relation to a third vehicle based on the comparison.

A vehicle in the present context may be any type of suitable road vehicle, such as e.g. a car, a bus, a truck, etc., but may, at least in relation to the second vehicle, also be other road user such a motorcyclist, a cyclist, a pedestrian etc.

A pose of a vehicle is in the present context to be construed as a geographic position (or map position) together with an orientation (heading) of the vehicle. In other words, a pose can be understood as a set (two or more) of coordinates of the vehicle in a global coordinate system and a direction of the vehicle in the coordinate system. A surrounding environment of a vehicle can be understood as a general area around the vehicle in which objects (such as other vehicles, landmarks, obstacles, roads etc.) can be detected and identified by vehicle sensors (radar, LIDAR, cameras, etc.), i.e. within a sensor range of the vehicle.

Driving assisting data are data assisting AD or ADAS systems or features the vehicle.

By means of the proposed method driving assisting data are determined that enable more reliable identification of a road geometry and/or a traffic condition than presently known systems and methods. In particular, the method is applicable in systems where a vehicle is capable of navigating/driving by using the map data. An aim is to compare reference data in the form of map data of a geographical area with sensor data regarding the geographical area. In addition to the sensor data regarding surrounding vehicles, map data may relate to a wide variety of other reference data that describes a geographical area, such as the surrounding environment of the first vehicle, and may comprise data regarding lighting conditions, road conditions, distance between vehicles, type of vehicles, road geometry, weather conditions, etc. In more detail, the method enables the use of sensor data regarding surrounding vehicles and environment and comparing the sensor data to the map data in order to provide driving assisting data.

The present disclosure is at least partly based on the realization that it would be advantageous to provide further data for increasing the robustness of presently known systems by providing driving assisting data that enable more reliable identification of a road geometry and/or a traffic condition ahead. An identified road geometry and/or traffic condition must be reliable in order for AD or ADAS systems or features to be applied. Thus, the inventors realized that it is possible to make use of a first vehicle's sensor data in relation to a second vehicle and map data in relation to the first vehicle's surrounding environment for determining driving assisting data in relation to a third vehicle.

According to an exemplary embodiment of the present disclosure, determining driving assisting data is based on whether or not the comparison indicates an inconsistency. By indicating any inconsistency, the driving assisting data enables more reliable identification of a road geometry and/or a traffic condition ahead in that situations where an inconsistency is indicated can be separated form situations an inconsistency is not indicated. Situations where no inconsistency is indicated typically instead indicate that any identification of a road geometry and/or a traffic condition ahead is more reliable. Hence, situations where identification of a road geometry and/or a traffic condition ahead is more reliable can be identified.

According to a further exemplary embodiment of the present disclosure, the driving assisting data comprises a confidence of the map data. For example, determining driving assisting data may comprise increasing a confidence value of the map data if the comparison indicates no inconsistency. Furthermore, determining driving assisting data may comprise decreasing a confidence value of the map data if the comparison indicates an inconsistency. Hence, situations where identification of a road geometry and/or a traffic condition ahead is more reliable can be identified as situations when the confidence of the map data is high according to the driving assisting data.

According to a further exemplary embodiment of the present disclosure, the driving assisting data comprise a traffic condition. The traffic condition may be one of a risk scenario, a traffic density, and a temporary traffic change.

In further exemplary embodiments of the present disclosure, further sensor data may be obtained. For example, further sensor data may be obtained from the sensor system of the first vehicle, wherein the further sensor data comprises poses and velocities of further vehicles located in the surrounding environment of the first vehicle. The poses and velocities of the further vehicles are then compared with the map data and driving assisting data are determined in relation to the third vehicle based on the comparison. In addition or in alternative, further sensor data may be obtained from sensor systems of a plurality of further vehicles, the further sensor data comprising poses and velocities of surrounding vehicles located in respective surrounding environment of the plurality of further vehicles. Further map data are also obtained comprising road geometries of the respective surrounding environment of the plurality of vehicles. The poses and velocities of the surrounding vehicles are then compared with the further map data and driving assisting data are determined in relation to the third vehicle based on the comparison. By obtaining further sensor data, the comparing with map data is based on a larger amount of sensor data and driving assisting data determined based on the comparison enables more reliable identification of a road geometry and/or a traffic condition.

According to an exemplary embodiment of the present disclosure, the method further comprises sending the determined driving assisting data to the third vehicle.

According to a second aspect of the present disclosure, there is provided a central control system. The central control system comprises at least one processor, and at least one memory. The one or more processor is configured to execute instructions stored in the memory causing the vehicle control system to perform a method for determining driving assisting data in relation to a vehicle based on sensor data in relation to other vehicles. The method comprises obtaining sensor data from a sensor system of a first vehicle, the sensor data comprising a pose and a velocity of a second vehicle located in a surrounding environment of the first vehicle, and obtaining map data comprising a road geometry of the surrounding environment of the first vehicle. The method further comprises comparing the pose and the velocity of the second vehicle with the map data, and determining driving assisting data in relation to a third vehicle based on the comparison. With this aspect of the disclosure, similar advantages and preferred features are present as in the previously discussed first aspect of the disclosure.

By a central control system is meant a control system that is remote from the vehicles and central to an extent that it may obtain sensor data from several vehicles. The central control system may be included in a cloud service. One central control system may serve a geographical area or a plurality of vehicles.

According to a third aspect of the present disclosure, there is provided a non-transitory computer-readable storage medium storing one or more programs configured to be executed by one or more processors of a central control system, the one or more programs comprising instructions for performing the method according to any one of the embodiments disclosed herein. With this aspect of the disclosure, similar advantages and preferred features are present as in the previously discussed first aspect of the disclosure.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF FIGURES

Further objects, features and advantages of embodiments of the disclosure will appear from the following detailed description, reference being made to the accompanying drawings, in which.

DETAILED DESCRIPTION

Figure 1:
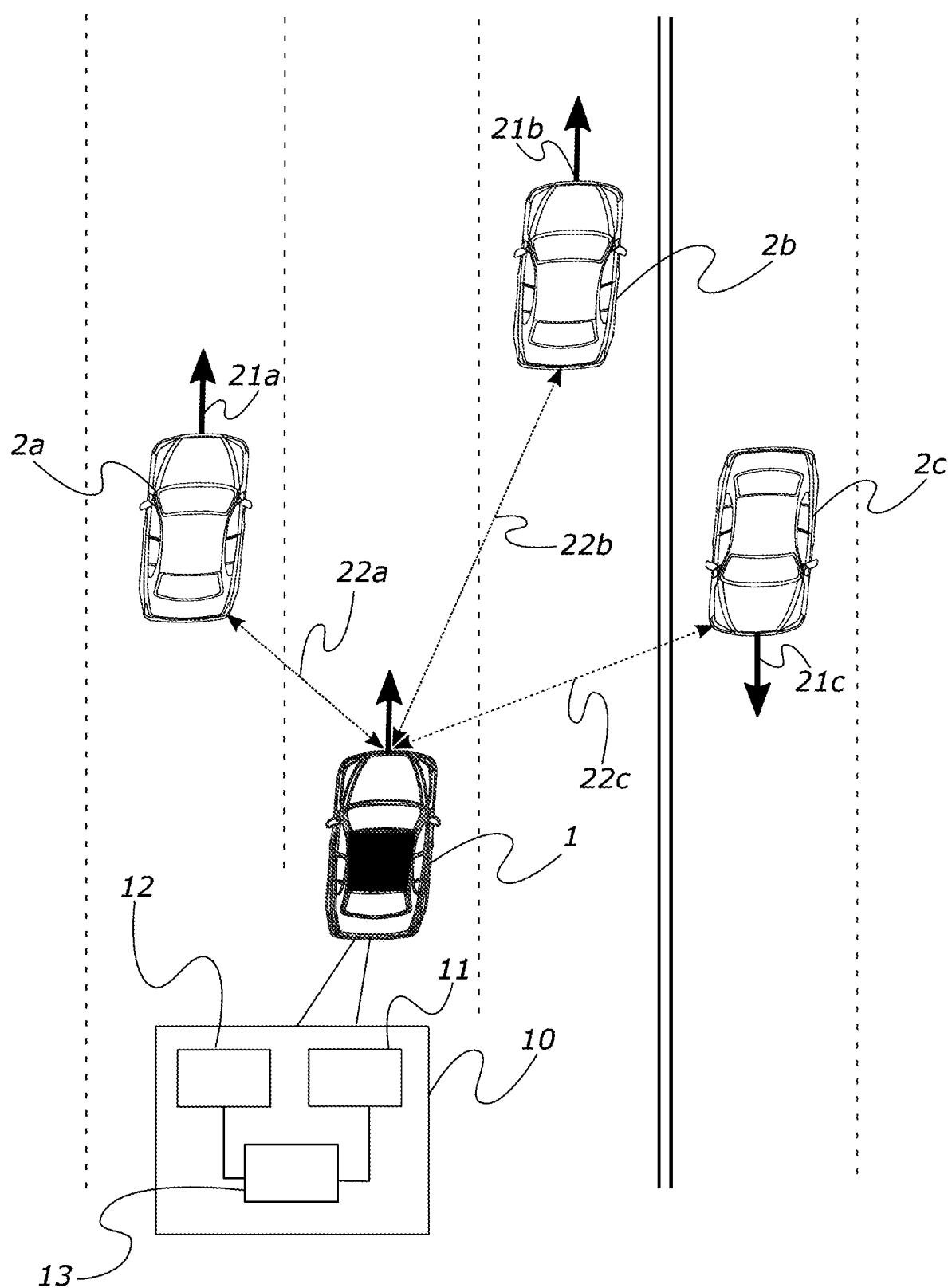
FIG. 1 is a schematic top view representation of a vehicle and surrounding vehicles in relation to embodiments of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

Figure 2:
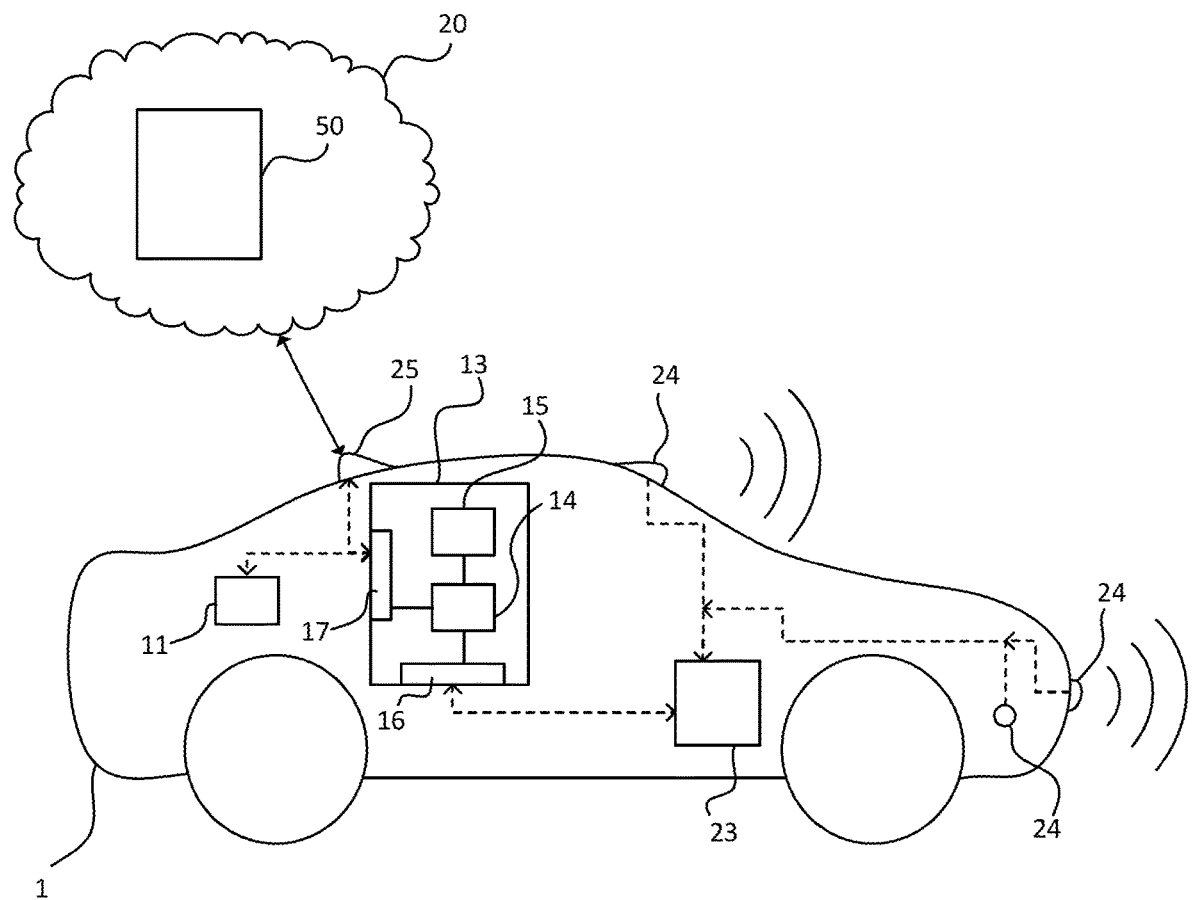
FIG. 2 is a schematic side view illustration of a vehicle comprising a vehicle control device in communication with a central control system of the present disclosure.
Figure 5:
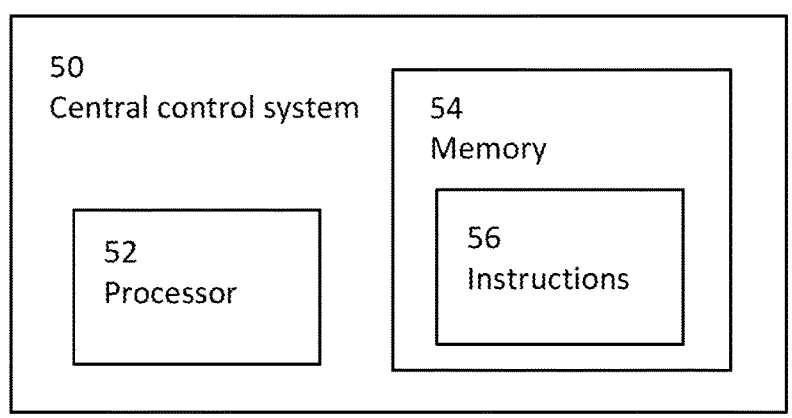
FIG. 5 is a schematic diagram of a central control system for determining for determining driving assisting data in accordance with an embodiment of the present disclosure.

FIG. 1 shows a schematic top-view illustration of a vehicle 1 with a vehicle control system 10 arranged to communicate with a central control system (not shown) in accordance with embodiments of the present disclosure and disclosed in relation to FIGS. 2 and 5. The vehicle 1 will in the following be referred to as the first vehicle 1. The schematic illustration shows the first vehicle on a road with four separate lanes and three surrounding second vehicles 2a, 2b, 2c. Two of the surrounding second vehicles 2a, 2b are traveling in the same direction as the first vehicle (i.e. on the same side of the road) but in different lanes, while one of the surrounding second vehicles 2c is traveling on the opposite side of the road.

The vehicle control system 10 comprises a localization system 11 configured to determine a set of geographical coordinates (i.e. a map position) of the first vehicle 1 and an orientation of the first vehicle 1. The orientation of the first vehicle is the orientation toward which a vehicle travels, that is, a vehicle orientation (a heading orientation). The geographical coordinates and the orientation are together also called a pose herein. The vehicle control system 10 has a sensor system 12 comprising at least one sensor (not shown) for detecting and identifying objects that are external to the first vehicle 1, thereby producing sensor data. The sensor system 12 may for example comprise one or more of a radar arrangement, LIDAR arrangement, and one or more cameras, or any other suitable sensor.

Furthermore, the vehicle control system 10 has a vehicle control device 13 connected to the localization system 11 and the sensor system 12. In more detail, the vehicle control device 13 is configured to acquire map data comprising a road geometry of a surrounding environment of the first vehicle. The road geometry includes a representation for the positional road map data (e.g., road centre or lane centre), and/or a representation for the road shape (i.e., curvature and/or heading). It should be understood that the vehicle control device 13 may comprise a digital signal processor arranged and configured for digital communication with an off-site server or cloud based server. Thus, data may be sent to and from the vehicle control device 13. Then, a geographical position of the first vehicle is determined by means of the localization system 11, which may determine the geographical position by means of a GNSS system, IMU data and the road geometry, and/or through the use of stationary landmarks as already exemplified in the foregoing.

Thus, depending on functionality provided in the control circuitry one or more communication interfaces (not shown) and/or one or more antenna interfaces (not shown) may be provided and furthermore, also one or more sensor interfaces (not shown) may be provided for acquiring data from sensors within the vehicle.

Next, the vehicle control device 13 is configured to, by means of the vehicle perception system 12, measure 22a, 22b, 22c a position and velocity, relative to the first vehicle 1, of each of one or more surrounding second vehicles 2a, 2b, 2c, located in the surrounding environment. The vehicle control device 13 is further configured to, by means of the sensor system 12, determine a map position of each of the one or more surrounding second vehicle 2a, 2b, 2c based on the geographical position of the first vehicle 1 and the measured positions of each of the one or more surrounding second vehicles 2a, 2b, 2c.

In other words, the vehicle control device 13 is configured to first determine the position of one or more surrounding second vehicles 2a, 2b, 2c in a local coordinate system of the first vehicle 1, and then to transform this position to a global coordinate system.

The vehicle control device 13 is further configured to, by means of the vehicle perception system 12, determine an orientation of each of the one or more surrounding second vehicles 2a, 2b, 2c, which together with the map position of each of the one or more surrounding second vehicles 2a, 2b, 2c forms a pose for each of the one or more surrounding second vehicles 2a, 2b, 2c.

FIG. 2 is a schematic side view illustration of a vehicle 1, such as the first vehicle 1 in relation to FIG. 1 comprising the vehicle control device 13 and the localization system 11. The vehicle control device 13 has a processor 14, a memory 15, a sensor interface 16 and a communication/antenna interface 17.

The first vehicle 1 has a sensor system comprising a plurality of sensors 24 (e.g. cameras, LIDARs, RADARs, ultrasound transducers, etc.). The sensors 24 are configured to acquire information representative of a surrounding environment of the vehicle. In more detail, the perception system 12 comprises sensors 24 suitable for tracking one or more road references (e.g. lane markings, road edges, other vehicles, landmarks, etc.) in order to estimate a road geometry and in particular a road boundary of the traveled upon road.

Further, the processor 14 of the vehicle control device 13 is configured to receive sensor data comprising information about the surrounding environment of the first vehicle 1. It should be appreciated that the sensor interface 16 may also provide the possibility to acquire sensor data directly (not shown) or via dedicated sensor control circuitry 23 in the vehicle. The communication/antenna interface 17 may further provide the possibility to send output to a remote location by means of an antenna 25. Moreover, some sensors 24 in the vehicle may communicate with the vehicle control device 13 using a local network setup, such as CAN bus, I2C, Ethernet, optical fibres, and so on. The communication/antenna interface 17 may be arranged to communicate with other control functions of the vehicle and may thus be seen as control interface also. However, a separate control interface (not shown) may be provided. Local communication within the vehicle may also be of a wireless type with protocols such as WiFi, LoRa, Zigbee, Bluetooth, or similar mid/short range technologies.

Further, the first vehicle 1 is connected to a central control system 50 in accordance with embodiments of the present disclosure and further disclosed in relation to FIG. 5. The central control system 50 is located in an external network 20. The connection from the first vehicle to the external network 20 may for example be via for instance a wireless link (e.g. for performing a part or all of the computations by means of remote resources) via the antenna 25. The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

Figure 3:
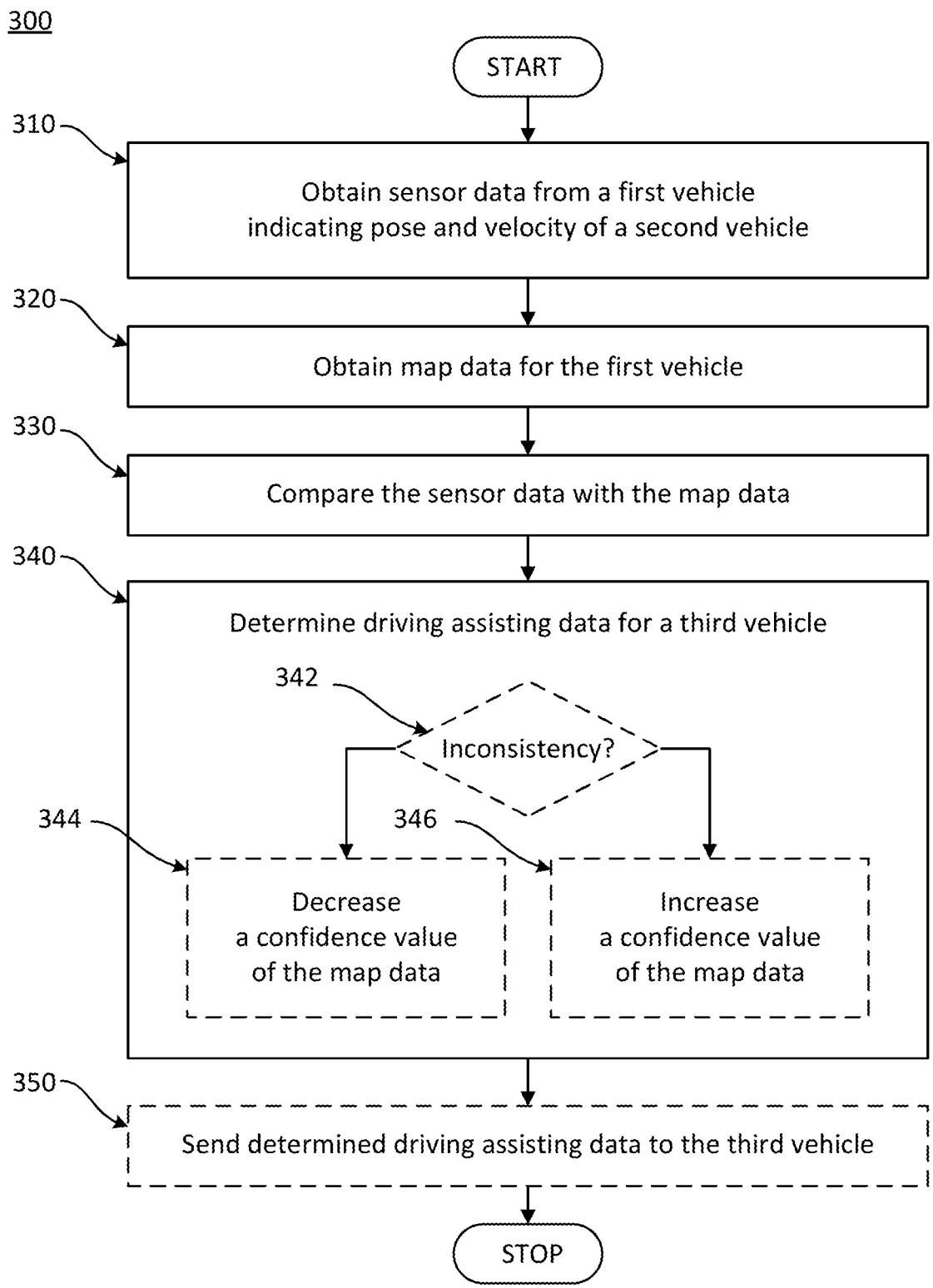
FIG. 3 is a flow-chart representation of a method for determining driving assisting data in accordance with an embodiment of the present disclosure.

FIG. 3 is a flow-chart representation of a method 300 for determining driving assisting in accordance with an embodiment of the present disclosure. The method may be performed in a central control system, e.g. in a central control system 50 in accordance with embodiments of the present disclosure and further disclosed in relation to FIGS. 2 and 5. By a central control system is meant a control system that is remote from the vehicles and central to an extent that it may obtain sensor data from several vehicles. The central control system may be included in a cloud service. One central control system may for example serve a specific geographical area or a specific plurality of vehicles.

In the method 300, sensor data are obtained 310 from a sensor system of a first vehicle. The first vehicle and sensor system may for example be the first vehicle 1 and sensor system 12 including sensors 24 as disclosed in relation to FIGS. 1 and 2, and the sensor data may be obtained from the first vehicle 1 via the communication/antenna interface 17 and antenna 25. The sensor data comprises a pose and a velocity of a second vehicle located in a surrounding environment of the first vehicle. The second vehicle may for example be one of the one or more surrounding second vehicles 2a, 2b, 2c, as disclosed in relation to FIG. 1. The second vehicle may be travelling in the same direction the opposite direction in relation to the first vehicle. If the second vehicle is travelling in the same direction as the first vehicle, it may be travelling in the same lane or in a different lane than the first vehicle.

Furthermore, map data are obtained 320. The map data comprises a road geometry of the surrounding environment of the first vehicle. Map data may be obtained from local memory of the device or system in which it is performed or it may be obtained from a memory in a remote site. The road geometry of the surrounding environment of the first vehicle may comprises non drivable areas and drivable areas of the surrounding environment of the first vehicle. The road geometry may further include a representation for the positional road map data (e.g., road centre or lane centre), and/or a representation for the road shape (i.e., curvature and/or heading). The pose and the velocity of the second vehicle are compared 330 with the map data, and driving assisting data in relation to a third vehicle are determined 340 based on the comparison. Driving assisting data, are data assisting AD or ADAS systems or features of the vehicle.

The driving assisting data may then be sent to the third vehicle.

An advantage of the method is that one vehicle can observe many other vehicles and especially that vehicles with ADAS features can help provide data for use in AD vehicles e.g. in relation to localization and trajectory planning. Furthermore, an advantage with obtaining sensor data from the sensor system of a (first) vehicle relating to the pose and velocity of another (second) vehicle is that sensor data relating also to a (second) vehicle that may itself not include a sensor system can be obtain. Hence, sensor data relating to the pose and velocity of a larger number of vehicles can be obtained which can be compared to map data and determine driving assisting data. This enables more reliable identification of a road geometry and/or a traffic condition than presently known systems and methods.

The driving assisting data may comprise a confidence value of the map data. The confidence value of the map data may be indicated or determined by the comparison. For example, if the comparison indicates that the confidence of the map data is low, the driving assisting data can indicate a low confidence value of the map data. Driving assisting data indicating the low confidence value of the map data may then be sent to a third vehicle which is in or is likely to be in a location where the map data are relevant. This makes it possible to avoid the use of map data which has a low confidence value and hence may not be valid in the third vehicle e.g. for use in assisting AD or ADAS systems or features of the third vehicle. In scenarios where the map data has a low confidence value, AD or ADAS systems or features would then be disabled and the vehicle may be switched over to manual mode in relation to such AD or ADAS systems or features.

If instead, the comparison indicates that the confidence of the map data is high, the driving assisting data can indicate a high confidence value of the map data. Driving assisting data indicating the high confidence value of the map data may then be sent to a third vehicle which is in or is likely to be in a location where the map data are relevant. This makes it possible to confirm the map data to enable the use of map data e.g. for use in assisting AD or ADAS systems or features of the third vehicle. In scenarios where the map data has a high confidence value, AD or ADAS systems or features may then be enabled.

Determining driving assisting data may be based on whether or not the comparison indicates an inconsistency 342, i.e. that the sensor data and the map data are inconsistent in some respect.

An inconsistency that the comparison may for example indicate is that a vehicle is driving where it is not supposed to drive according to the map data. This could for instance be due temporary traffic changes.

An inconsistency may further indicate that map data are not valid or that the map data has low confidence or at least that there may be an issue in relation to the validity and/or confidence of the map data. Similarly, if there is no inconsistency this may indicate that map data are valid or that the map data has high confidence or at least that there is no indication of any issues in relation to the validity and/or confidence of the map data.

For example, determining driving assisting data may comprise decreasing 344 a confidence value of the map data if the comparison indicates an inconsistency. Similarly, determining driving assisting data may comprise increasing 346 a confidence value of the map data if the comparison indicates no inconsistency.

The method 300 may be used in map validation, e.g. using determined confidence values for map data. Generally, map validation may comprise:

Collection and supervising
rectification and anonymization
local map creation
alignment
validation
aggregation
assessment with optional reporting.

The purpose of map validation is to keep a HD map up to date. The map will generally be located in the cloud and map data may be obtained by a central control system. Both ADAS and AD vehicles are used as probes and sensor data from sensor systems of the ADAS and AD vehicles are obtained in the central control system.

In collection, probe data including e.g. sensor data are collected (obtained) in the central control system and transformed to a suitable format. Features of the method 300 can be used to collect (obtain) sensor data from one or more first vehicles, the sensor data comprising a pose and a velocity of one or more second vehicles located in a surrounding environment of the respective one of the one or more first vehicle.

In rectification and anonymization, the sensor data are cleaned up, anonymized, and aligned. Sensor data are filtered and ordered in strict time order within anonymous observation batches.

Local map creation operates on a stream of anonymized sensor data and creates a local map. This involves translating sensor data into local coordinates relative to a point of reference in global coordinate system, typically corresponding to the middle of the vehicles rear axis and finally delimiting the output into local sub-maps. Features of the method 300 can be used by taking into account the sensor data comprising the pose and the velocity of the one or more second vehicles located in the surrounding environment of the respective one of the one or more first vehicle.

In alignment the created local map is input and is rotated and translated, and matched points between the local map and the HD map are output.

The validation receives matched points between local map and HD Map from alignment and outputs HD Map object identities along with a validated metric, i.e., type, distance, etc, for a single sub-map. Parts of the local map are validated against each of the HD map objects within the coverage area (bounding box) and any differences (metrics/inconsistencies) are noted. These metrics/inconsistencies will input to aggregation. Features of the method 300 can be used by taking into account the sensor data comprising the pose and the velocity of the one or more second vehicles located in the surrounding environment of the respective one of the one or more first vehicle and any inconsistencies indicated by comparison of the sensor data with map data.

When querying a HD map for map objects (map data) within a certain area (bounding box) it will return map objects like traffic signs, lane markers and center lanes. Each map object contains at least one geographical position (shape point) containing latitude, longitude and height. Traffic signs contain e.g. only one shape point and meta data (e.g. sign type), while a lane markers contains a set of shape points and meta data.

The aggregation receives HD Map object identities with corresponding validated metrics/inconsistencies for many sub-maps as input. Sensor data are summarized for a locality over a time.

After aggregation there is an assessment where a decision is taken whether or not to act on any deviances (metrics/inconsistencies).

For example, reports may be sent to map stakeholders for any deviances (metrics/inconsistencies). Features of the method 300 can be used by determining a confidence value of map data based on inconsistencies and provide the confidence value to a third vehicle.

Figure 4:
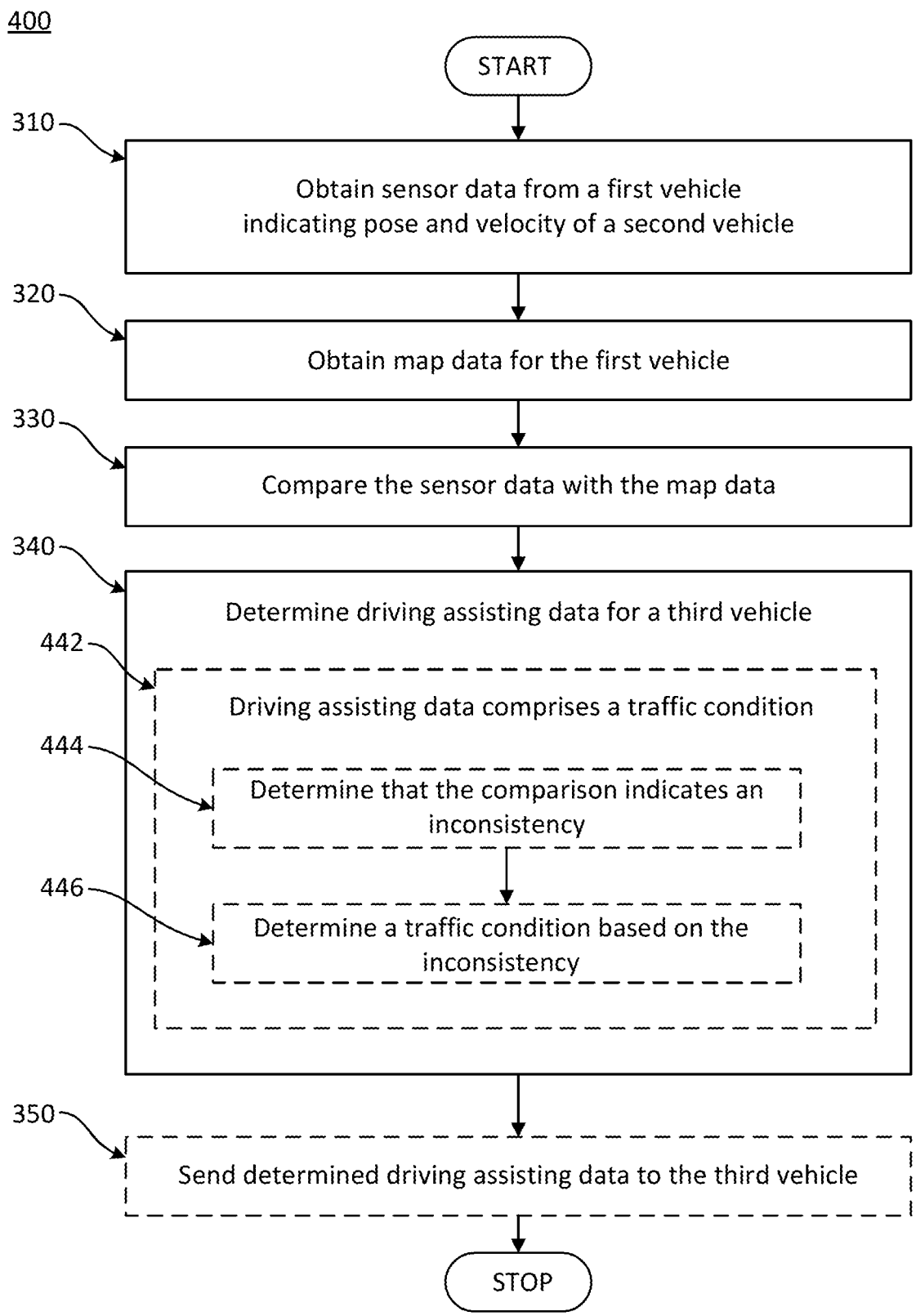
FIG. 4 is a flow-chart representation of a method for determining driving assisting data in accordance with another embodiment of the present disclosure.

FIG. 4 is a flow-chart representation of a method 400 for determining driving assisting data in accordance with another embodiment of the present disclosure. The method 400 may be performed in a central control system, e.g. in a central control system 50 as disclosed in relation to FIGS. 2 and 5. In the method 400, sensor data are obtained 310 from a sensor system of a first vehicle. Furthermore, map data are obtained 320. The map data comprises a road geometry of the surrounding environment of the first vehicle. The pose and the velocity of the second vehicle are compared 330 with the map data, and driving assisting data in relation to a third vehicle are determined 340 based on the comparison. The driving assisting data may then be sent to the third vehicle.

Generally, the steps 310, 320, 330, 340 and 350 are the same as the corresponding steps in the method 300 described in relation to FIG. 3 and the disclosure in relation to FIG. 3 is valid also for the method 400.

The determined driving assisting data based on the comparison may comprise a traffic condition 442. The traffic condition may be determined based on the comparison 330 of the sensor data with the map data.

The traffic condition may then be sent to the third vehicle where it may be used to for determination of operational design domain (ODD), i.e. specific conditions under which a given driving AD or ADAS system or feature thereof is designed to function, including, but not limited to, driving modes. This can incorporate a variety of limitations, such as those from geography, traffic, speed, and roadways. This makes it possible to assist AD systems or features of the third vehicle. In scenarios where requirements for ODD are not fulfilled e.g. due to an identified traffic condition, AD features would then be disabled or not enabled and the third vehicle may be switched over to manual mode in relation to such AD or ADAS systems or features.

An advantage of the method is that one vehicle can observe many other vehicles and especially that vehicles with ADAS features can help provide driving assisting data comprising a traffic condition of high importance for AD vehicles' localization and trajectory planning. Furthermore, an advantage with obtaining sensor data from the sensor system of a (first) vehicle relating to the pose and velocity of another (second) vehicle is that sensor data relating also to a (second) vehicle that may itself not include a sensor system can be obtain. Hence, sensor data relating to the pose and velocity of a larger amount of vehicles can be obtained which can be compared to map data and determine driving assisting data comprising a traffic condition. This may further enable more reliable identification of a traffic condition than presently known systems and methods.

The driving assisting data comprising the traffic condition may further include enhanced traffic information. For example, in the comparison 330, a traffic condition such as high density traffic may be identified in a specific lane and low density traffic in other lanes. Such enhanced traffic information can be provided to a third vehicle, such as a third vehicle which is located or likely to be located within the area relevant for the driving assisting information.

Determining driving assisting data comprising a traffic condition may be based on whether or not it is determined 444 that the comparison indicates an inconsistency, i.e. that the sensor data and the map data are inconsistent in some respect. A traffic condition can then be determined 446 based on the inconsistency.

An inconsistency that the comparison may indicate is that a vehicle is driving where it is not supposed to drive according to the map data, e.g. where the map data does not indicate a drivable area. It can also indicate that a vehicle is driving in a direction or speed is not supposed to drive according to the map data, e.g. that the vehicle is driving in a lane in the wrong direction or in a speed that is higher or lower than what is expected in relation to the map data. Based on such indications, a temporary traffic change, a risk scenario or other traffic condition may be identified.

Depending on identification of a temporary traffic change, a risk scenario or other traffic condition the requirements for ODD may not be fulfilled. In such scenarios, AD features would be disabled or not enabled for an AD vehicle receiving the driving assisting data and driving may be switched over to manual mode in relation to such AD features.

Furthermore, in relation to FIGS. 1-4 further sensor data can be obtained, either from a first vehicle in relation to further surrounding (second) vehicles, or from further (first) vehicles in relation to respective surrounding (second) vehicles, or both. This is discussed in the following.

Further sensor data from the sensor system of the first vehicle can be obtain. The further sensor data comprising poses and velocities of further vehicles located in the surrounding environment of the first vehicle. The poses and velocities of the further vehicles may then be compared with the map data and driving assisting data are determined based on the comparison.

For a scenario where the further sensor data relate to the same or overlapping surrounding environment, i.e. that the first vehicle was in the same or similar location when the further sensor data were generated, and where the sensor data were generated within a predetermined period, the further sensor data from the sensor systems of the plurality of further vehicle may be aggregated and compared to map data after aggregation.

An advantage with obtaining sensor data relating to the pose and velocity of further vehicles is that sensor data relating can be received from one (first) vehicle in relation to further (second) vehicles. Hence, sensor data relating to the pose and velocity of a greater number of further vehicles can be obtained which can be compared to map data and determine driving assisting data. This enables more reliable identification of a road geometry and/or a traffic condition than presently known systems and methods.

To the extent that the sensor data from the sensor system of the first vehicle in relation to the second vehicle has a reduced quality in comparison to sensor data regarding the first vehicle itself, the obtaining of sensor data in relation to a greater number of further vehicles will provide a greater amount of sensor data which can compensate and more for possible reduced quality.

The length of the predetermined period will generally depend on the application and on the type of driving assisting data that are to be determined.

Further sensor data from sensor systems of a plurality of further vehicles may be obtained. The further sensor data comprising poses and velocities of surrounding vehicles located in respective surrounding environment of the plurality of further vehicles. Also, further map data are obtained comprising road geometries of the respective surrounding environment of the plurality of vehicles. The poses and velocities of the surrounding vehicles may then compared with the further map data and driving assisting data are determined based on the comparison.

For a scenario where the further sensor data relate to the same or overlapping surrounding environment, i.e. that the further vehicles were in the same or similar location when the further sensor data were generated, and where the sensor data were generated within a predetermined period, the further sensor data from the sensor systems of the plurality of further vehicle may be aggregated and compared to map data after aggregation.

An advantage with obtaining sensor data from further vehicles relating to the pose and velocity of further other vehicles in the respective surrounding environment of the further vehicles, is that sensor data relating to also to further vehicles that themselves do not include a sensor system can be obtain. Hence, sensor data relating to the pose and velocity of a greater number of vehicles can be obtained which can be compared to map data and determine driving assisting data. This enables more reliable identification of a road geometry and/or a traffic condition than presently known systems and methods.

To the extent that the sensor data from the sensor system of the each of the further vehicle in relation to each of the surrounding vehicles has a reduced quality in comparison to sensor data regarding the vehicle itself, the obtaining of sensor data from a greater number of vehicles and in relation to a greater number of surrounding vehicles will provide a greater amount of sensor data which can compensate and more for possible reduced quality.

The length of the predetermined period will generally depend on the application and on the type of driving assisting data that are to be determined.

FIG. 5 is a schematic diagram of a central control system 50 for determining for determining driving assisting data in accordance with an embodiment of the present disclosure. The central control system at least one processor 52 and at least one memory 54. The processor is configured to execute instructions 56 stored in the memory causing the central control system 50 to perform method for determining driving assisting data in relation to a vehicle based on sensor data in relation to other vehicles according to the disclosure and in particular according to the embodiments disclosed in relation to FIGS. 3 and 4.

The central control system 50 may for example be manifested as a general-purpose processor, an application specific processor, a circuit containing processing components, a group of distributed processing components, a group of distributed computers configured for processing, a field programmable gate array (FPGA), etc. The central control system 50 may further include a microprocessor 14, microcontroller, programmable digital signal processor or another programmable device. The central control system 50 may also, or instead, include an application-specific integrated circuit (ASIC), a programmable gate array or programmable array logic, a programmable logic device, or a digital signal processor. Where the central control system 50 includes a programmable device such as the microprocessor, microcontroller or programmable digital signal processor mentioned above, the processor may further include computer executable code that controls operation of the programmable device.

The processor(s) 52 (associated with the central control system 50) may be or include any number of hardware components for conducting data or signal processing or for executing computer code (instructions 56) stored in memory 54. The memory 54 may be one or more devices for storing data and/or computer code for completing or facilitating the various methods described in the present description. The memory 54 may include volatile memory or non-volatile memory. The memory 54 may include database components, object code components, script components, or any other type of information structure for supporting the various activities of the present description. According to an exemplary embodiment, any distributed or local memory device may be utilized with the systems and methods of this description. According to an exemplary embodiment the memory 54 is communicably connected to the processor 52 (e.g., via a circuit or any other wired, wireless, or network connection) and includes computer code for executing one or more processes described herein.

Comprised in the central control system 50 may be a non-transitory computer-readable storage medium 54 storing one or more programs configured to be executed by one or more processors 52 of the central control system 50, the one or more programs comprising instructions 56 for causing the central control system 50 to perform the method according to the disclosure and in particular according to the embodiments disclosed in relation to FIGS. 3 and 4.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to compare the sensor data (movement of the other vehicle) with the pre-defined behaviour model. The different features and steps of the embodiments may be combined in other combinations than those described.

Exemplary methods, computer-readable storage media, control devices, vehicles, and infrastructure devices are set out in the following items:

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of receiving signals comprising information about a movement and information about a current road scenario may be interchanged based on a specific realization. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A method for determining driving assisting data in relation to a vehicle based on sensor data and map data in relation to other vehicles, the method comprising:
   obtaining sensor data from a sensor system of a first vehicle, the sensor data comprising a pose and a velocity of a second vehicle located in a surrounding environment of the first vehicle;
   obtaining map data comprising a road geometry of the surrounding environment of the first vehicle;
   comparing the pose and the velocity of the second vehicle with the map data;
   determining driving assisting data in relation to a third vehicle based on the comparison; and
   sending the determined driving assisting data to the third vehicle.

2. The method of claim 1, wherein the driving assisting data comprise a confidence value of the map data.

3. The method of claim 1, wherein determining driving assisting data is based on whether or not the comparison indicates an inconsistency.

4. The method of claim 2, wherein determining driving assisting data comprises:
   if the comparison indicates no inconsistency, increasing the confidence value of the map data.

5. The method of claim 2, wherein determining driving assisting data comprises:
   if the comparison indicates an inconsistency, decreasing the confidence value of the map data.

6. The method of claim 1, wherein the driving assisting data comprise a traffic condition.

7. The method of claim 6, wherein the traffic condition is one of a risk scenario, a traffic density, and a temporary traffic change.

8. The method of claim 1, further comprising:
   obtaining further sensor data from the sensor system of the first vehicle, the further sensor data comprising poses and velocities of further vehicles located in the surrounding environment of the first vehicle; and
   comparing the poses and velocities of the further vehicles with the map data.

9. The method of claim 1, wherein the second vehicle is located in a neighbouring lane or an opposing lane in the surrounding environment of the first vehicle.

10. The method of claim 1, wherein the road geometry of the surrounding environment of the first vehicle comprises non drivable areas and drivable areas of the surrounding environment of the first vehicle.

11. The method of claim 1, further comprising:
obtaining further sensor data from sensor systems of a plurality of further vehicles, the further sensor data comprising poses and velocities of surrounding vehicles located in respective surrounding environment of the plurality of further vehicles;
obtaining further map data comprising road geometries of the respective surrounding environment of the plurality of vehicles; and
comparing the poses and velocities of the surrounding vehicles with the further map data.

12. The method of claim 11, wherein the road geometries of the respective surrounding environment of the plurality of further vehicles comprises non drivable areas and drivable areas of the respective surrounding environment of the plurality of further vehicles.

13. The method of claim 1, wherein the determined driving assisting data comprises a traffic condition that is sent to the third vehicle for determining operational design domain.

14. A central control system comprising:
at least one processor;
at least one memory,
wherein the at least one processor is configured to execute instructions stored in the memory causing the central control system to perform method for determining driving assisting data in relation to a vehicle based on sensor data in relation to other vehicles, the method comprising:
obtaining sensor data from a sensor system of a first vehicle, the sensor data comprising a pose and a velocity of a second vehicle located in a surrounding environment of the first vehicle;
obtaining map data comprising a road geometry of the surrounding environment of the first vehicle;
comparing the pose and the velocity of the second vehicle with the map data;
determining driving assisting data in relation to a third vehicle based on the comparison; and
sending the determined driving assisting data to the third vehicle.

15. The central control system of claim 14, wherein the determined driving assisting data comprises a traffic condition that is sent to the third vehicle for determining operational design domain.

16. A non-transitory computer-readable storage medium storing one or more programs configured to be executed by one or more processors of a vehicle control system, the one or more programs comprising instructions for causing the central control system to perform the method for determining driving assisting data in relation to a vehicle based on sensor data and map data in relation to other vehicles, the method comprising:
obtaining sensor data from a sensor system of a first vehicle, the sensor data comprising a pose and a velocity of a second vehicle located in a surrounding environment of the first vehicle;
obtaining map data comprising a road geometry of the surrounding environment of the first vehicle;
comparing the pose and the velocity of the second vehicle with the map data;
determining driving assisting data in relation to a third vehicle based on the comparison; and
sending the determined driving assisting data to the third vehicle.

* * * * *